(12) United States Patent
Alsio et al.

(10) Patent No.: US 7,362,305 B2
(45) Date of Patent: Apr. 22, 2008

(54) DATA INPUT DEVICE

(75) Inventors: Gunilla Alsio, Stockholm (SE); Lars Asplund, Vasteras (SE); Fredrik Ekstrand, Vasteras (SE)

(73) Assignee: Senseboard Technologies AB, Stockholm (SE)

( * ) Notice: Subject to any disclaimer, the term of this patent is extended or adjusted under 35 U.S.C. 154(b) by 605 days.

(21) Appl. No.: 11/027,385

(22) Filed: Dec. 31, 2004

(65) Prior Publication Data

US 2005/0172734 A1    Aug. 11, 2005

Related U.S. Application Data

(63) Continuation-in-part of application No. 10/486,611, filed on Feb. 10, 2004, now Pat. No. 7,295,181.

(51) Int. Cl.
*G09G 5/00* (2006.01)
(52) U.S. Cl. .................... 345/156; 341/22; 340/825.19
(58) Field of Classification Search ........ 345/156–184; 341/20–22
See application file for complete search history.

(56) References Cited

U.S. PATENT DOCUMENTS

| 3,737,231 A * | 6/1973 | Low et al. ............... 372/25 |
| 5,097,252 A | 3/1992 | Harvill et al. |
| 5,412,619 A * | 5/1995 | Bauer ..................... 367/128 |
| 5,581,484 A * | 12/1996 | Prince ..................... 702/150 |
| 6,049,327 A | 4/2000 | Walker et al. |
| 6,380,923 B1 * | 4/2002 | Fukumoto et al. .......... 345/156 |

FOREIGN PATENT DOCUMENTS

| WO | WO 98/35442 | 8/1998 |
| WO | WO 02/27456 | 4/2002 |

\* cited by examiner

*Primary Examiner*—Alexander Eisen
*Assistant Examiner*—Cory A Almeida
(74) *Attorney, Agent, or Firm*—Fasth Law Offices; Rolf Fasth

(57) ABSTRACT

The method of entering data into a computer device. A wearable device is attached to a first body part. The device has a lower unit and an upper unit connected to the lower unit. The device has sensors in operative engagement therewith for registering movements. The wearable device has a first accelerometer and a second accelerometer. The lower unit is provided with non-movable parts. A segment of a second body part is moved relative to the device without having physical contact with the sensors. The movement of the segment activates the sensors. The sensors sending sensor signals to a microprocessor unit. The first accelerometer senses an acceleration movement in a first direction. The second accelerometer senses an acceleration movement in a second direction. The first and second accelerometers send acceleration movement signals to a microprocessor unit that stores acceleration movement signals from the accelerometers together with the sensor signals to learn movements of the body part.

9 Claims, 5 Drawing Sheets

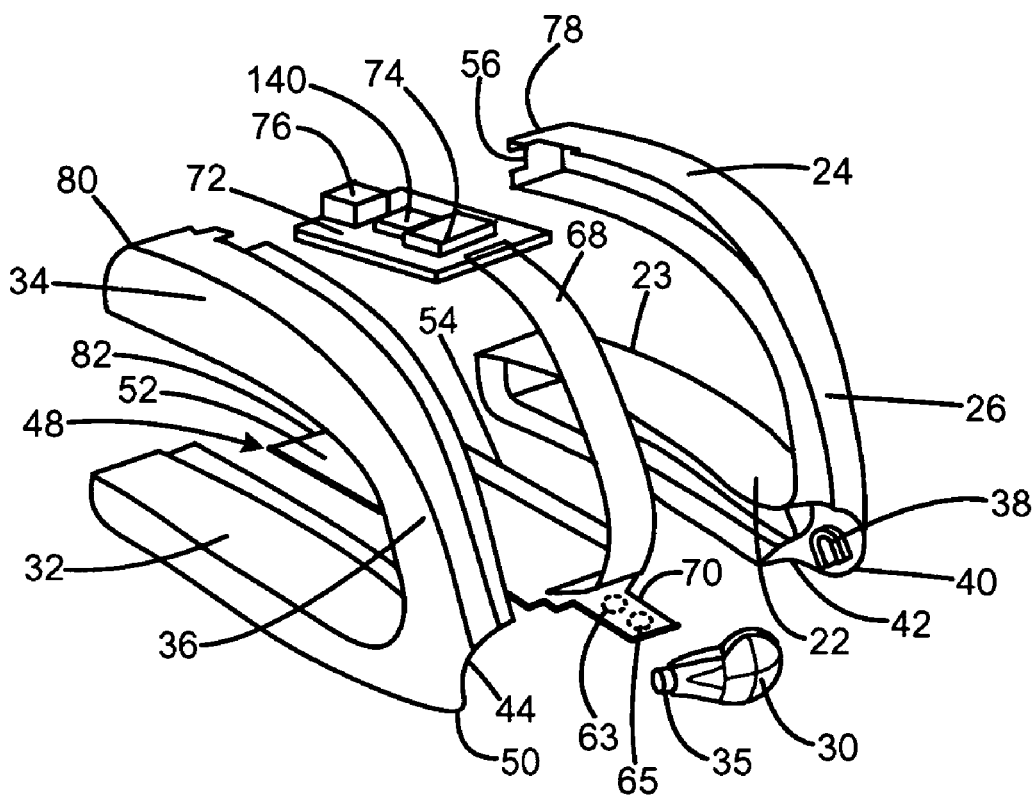
FIG. 3a
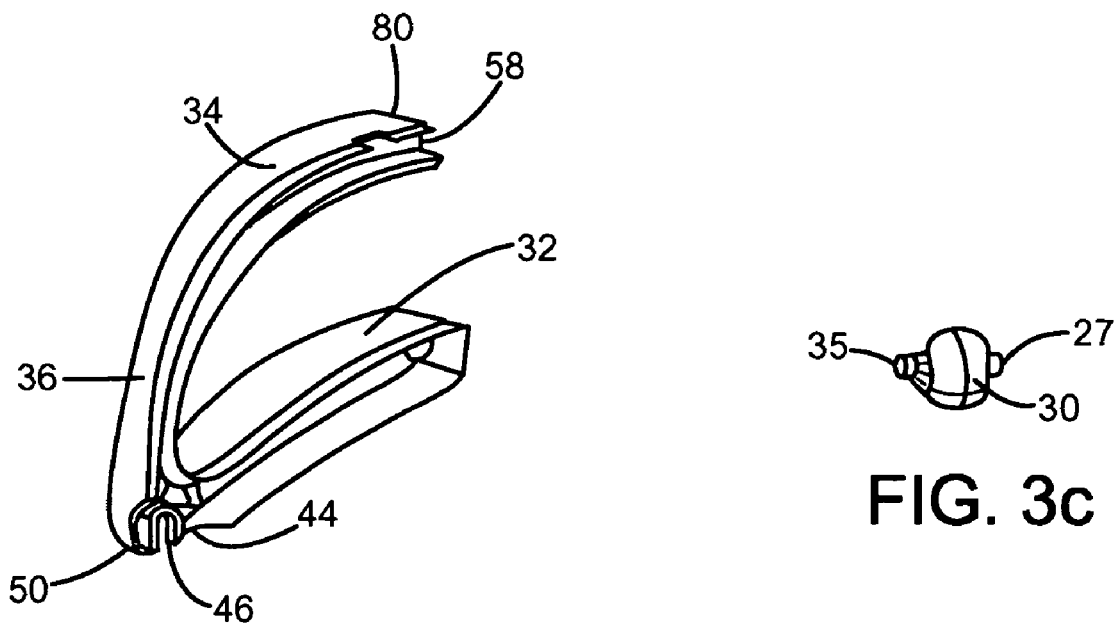
FIG. 3b
FIG. 3c

DATA INPUT DEVICE

PRIOR APPLICATION

This is a continuation-in-part application of U.S. patent application Ser. No. 10/486,611, filed 10 Feb. 2004 now U.S. Pat. No. 7,295,181.

TECHNICAL FIELD

The present invention relates to a data input device that may involve movements of the metacarpophalangeal joints of the hands or joints of other body parts for information input activities.

BACKGROUND AND SUMMARY OF INVENTION

Conventional data input interfaces with computers most often requires keyboards. It is sometimes cumbersome to use keyboards especially if the computer or communication device is very small so that each letter or command button is also very small. For example, it is very inconvenient to enter text messages into a mobile phone or PDA because the devices are so small. In other situations, it is simply inconvenient to use a conventional keyboard because there is not sufficient room for the user to use the relatively large keyboards. There is a need for a convenient and reliable way of entering data into a computer device. The method of the present invention provides a solution to the above-outlined problems. More particularly, the method of the present invention is for entering data into a computer device. A wearable device is attached to a first body part. The device has a lower unit and an upper unit connected to the lower unit. The device has sensors in operative engagement therewith for registering movements. The wearable device has a first accelerometer and a second accelerometer. The lower unit is provided with non-movable parts. A segment of a second body part is moved relative to the device. The movement of the segment activates the sensors. The first accelerometer senses an acceleration movement in a first direction. The second accelerometer senses an acceleration movement in a second direction. The first and second accelerometers send acceleration movement signals to a microprocessor unit that stores acceleration movement signals from the accelerometers to record movements of the body part. The device also has a unique sensing technology and learning system.

BRIEF DESCRIPTION OF DRAWINGS

FIG. 3a is a perspective exploded view of the handheld device of FIG. 2;

FIG. 3b is a perspective view of a detail of the handheld device of FIG. 3a;

FIG. 3c is a perspective view of a detail of the handheld device of FIG. 3a;

DETAILED DESCRIPTION

Figure 1:
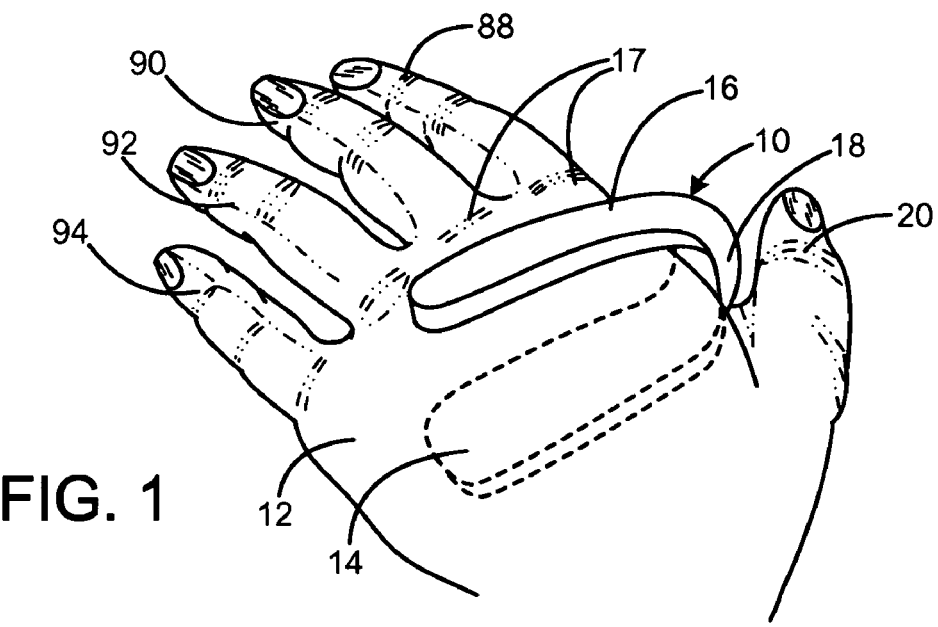
FIG. 1 is a perspective view of the handheld device of the present invention mounted on a left hand.

With reference to FIGS. 1-7, the present invention is a data input device 10 for entering information into, for example, a computer connected to the device 10 without using a conventional keyboard or physical command buttons. The device may also be used to register and interpret hand movements or other gestures. It is to be understood that the attachment of the device to a hand is only used as an illustrative example and the device may be attached to other body parts. The device could be attached to any suitable body part. The information may include text information such as a typing or remote control of certain functions of a machine. The device may be handheld and a modified version of the device may be worn on the wrist or any other suitable place.

The device 10 may be mounted, for example, to a hand 12 so that the lower unit 14 is placed below palm and finger sections of the hand 12 and the upper unit 16 is placed above the hand 12 behind the knuckles 17. The unit 16 may include a PDA or a small display for showing, for example, what is being typed. Preferably, the housing units 14, 16 are connected by a connecting portion 18 disposed inside and adjacent to a thumb 20. The preferred position of the device 10 in the hand 12 is explained in detail below.

The lower housing unit 14 has a front portion 22 and a rear portion 32. The upper housing unit 16 has a front portion 24 and a rear portion 34. The connecting housing unit 18 has a front portion 26 and a rear portion 36. An end 40 of the portion 22 has a cavity 42 and an end 50 of the portion 32 has a cavity 44. More particularly, the end 40 has a groove 38 and the end 50 has a groove 46 defined therein, and a part 27 and a part 35 of unit 30 may be applied to the groove 38 and 46 respectively. The end 78 of the front portion 24 has a cavity 56 and the end 80 of the rear portion 34 has a cavity 58.

Figure 4A:
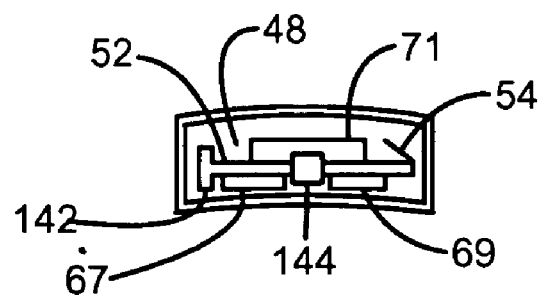
FIG. 4a is a cross-sectional end view of the handheld device along line 4-4 of FIG. 2.
Figure 4B:
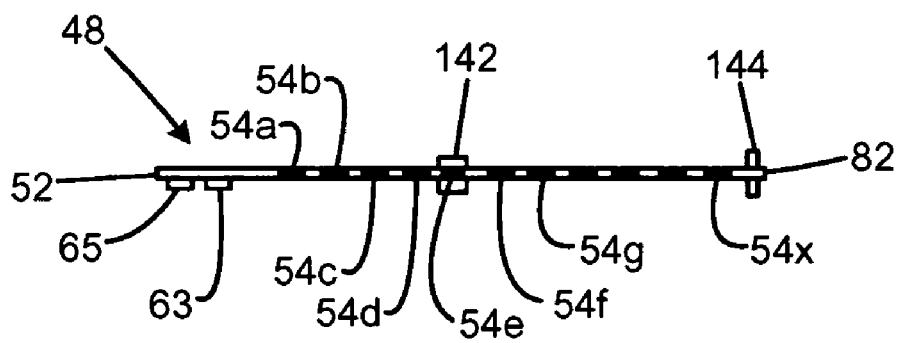
FIG. 4b is a cross-sectional side of the sensor device of the present invention.

A sensor device 48 may be placed in the housing 14. The device 48 has a printed circuit board 52, a cable unit 68 and at least one accelerometer 144, as best shown in FIG. 4a, attached thereto at an end portion 82. The accelerometer 144 may be used to measure accelerations in the y-direction and in the z-direction. As best shown in FIG. 4b, the sensor device 48 may also have an accelerometer 142 that is placed along one side of the device such as opposite the side where the sensors 54 are formed as a flexible circuit board. The accelerometer 142 may be used to measure accelerations in the x-direction and in the z-direction. It is to be understood that the accelerometers 142, 144 may be placed in any other suitable place on the device 10. The device 48 may also have one or several accelerometers 142, 144 attached thereto. It may be possible to use accelerometers that measure in one, direction, two directions or three directions.

Figure 2:
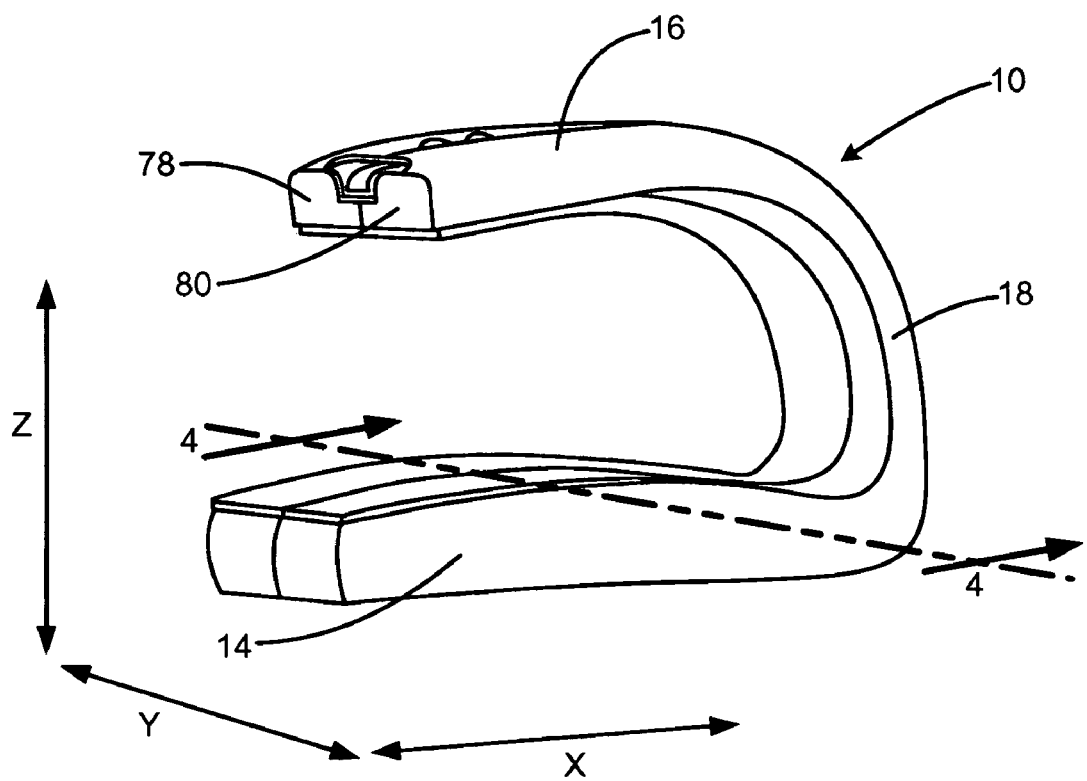
FIG. 2 is a perspective view of the handheld device of FIG. 1.

A connectivity device 72 may be placed in the upper unit 16. The device 72 having a radio transmitter 74 and a DC-port 76. The device 72 may also have one or several accelerometers 140 attached thereto. It may be possible to use accelerometers that measure in one direction, two directions or three directions. The accelerometers 140 may be used to measure accelerations in the x-direction and in the y-direction. The directions of the x-direction, the y-direction and the z-direction are shown in FIG. 2. The accelerometer 140 is attached to board 72 that is separate and shifted in the z-direction relative to the circuit board 52 that has the accelerometers 142, 144 attached thereto.

The accelerometers 140, 142 and 144 may be used to exactly determine the angle of the device 10 in space when the finger is moved to activate the sensors 54. It turns out that the angle of the device 10 together with the information from the sensors 54 provide information about which command the user is intending to perform. It is therefore also important for the device 10 to memorize the exact angle of the device 10 and the values of the sensors 54 when a particular command, such as a letter, is intended to know next time the user is attempting to perform the same command.

Figure 4C:
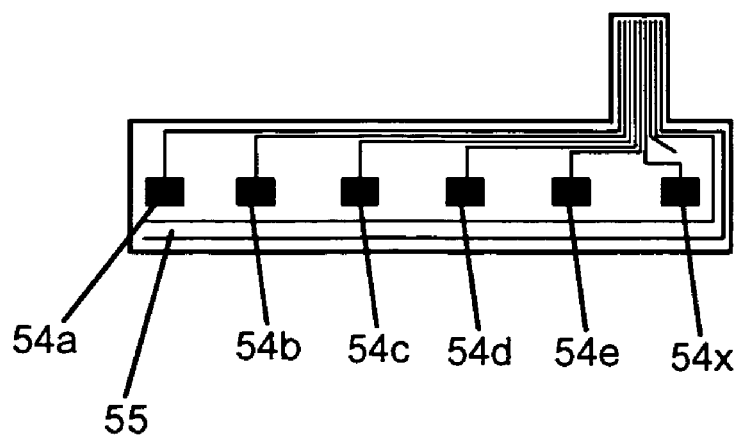
FIG. 4c is a view of the sensor device of the present invention.

More particularly, the flexible printed circuit board associated with the sensors 54 is sensitive to and continuously register movements in the metacarpophalangeal joints. Preferably, the sensors 54 are of a type which do not require a touch to register a movement. For example, electric field sensing could be used. The sensors 54 may be sensitive to capacitance changes or electric field changes i.e. the sensor may be sensitive to the ratio between a charging current and the rate of change of voltage with time. Preferably, an electrode 55 extends across all the sensors 54, as best shown in FIG. 4c. The electrode may send out an AC voltage at a relatively high frequency such as 200 kHz. There is a capacitive connection between the electrode and the finger sensors 54 so that a portion of the emitted AC voltage is taken up by the finger. The closer the finger is to the electrode, the bigger the portion that is taken up by the finger and the finger sensors 54 are exposed to less AC voltage. Therefore, the capacitance between the finger and the electrode is thus measured and the distance between the finger and the electrode is determined without touching or mechanically deforming the sensors 54. It is also possible, to have the sensors 54 send out an AC signal and the electrode 55 as the receiver.

As best shown in FIG. 4b, the sensor 54 consists of several individual sensors (54a, 54b, 54c, 54d . . . 54x), where the number exceeds four. It is to be understood that in another embodiment only one sensor could be sufficient. Each individual sensor registers the distance to the closest finger and the actual distance to that finger. By forming linear combinations of the value from each of the individual sensors, 54a . . . 54x, the actual position of each individual finger can be calculated. It is through this continuous measurement it is possible to draw the conclusion that a finger has moved. It is therefore not necessary to rely on only one movement to conclude that a movement has been made. Preferably, the sensors are positioned below the palm 106 and a distal portion 97 of the hand 12. The sensors being sensitive to the proximity to an object, in this preferred embodiment defined as a proximal portion 104 of the fingers 88, 90, 92, and 94. The present invention is not limited to one sensor per finger since the system considers the movement of all the fingers, as explained below. It is not necessary to change the size of the sensor 54 for different hand sizes, only the coefficients of the linear combination has to be changed.

As indicated above, the board 48 may be used to register movements of the fingers of the hand 12. However, as explained below, the device 10 takes the movements of all the fingers and the hand into the account before it determines which letter or command the user intended to activate. In this way, not only the movement of the active finger but also the movement of adjacent fingers as well as the hand are used when determining which letter or command the user intended.

The central section of sensor device 48 has a stiff or bendable battery unit 71 that is in operative engagement with a computer processing unit 69 on the section. The invention is not limited to battery units and any suitable power source may be used. The section may also have a converter 67 that converts analog signals to digital signals. The device 48 is dimensioned so that it may fit inside the housing 14, the device 72 is dimensioned so that it may fit inside the upper unit 16 and the unit 68 is dimensioned so that it may fit inside the connecting housing 18. The connectivity device 72 has a DC input connector/communication port 76 that fits into the cavities 56, 58. The port 76 may be used to recharge the battery 71 or to power the device 10. The port 76 may also be used to connect the device 10 to a computer or any other suitable device that can receive signals produced by the device 10. The port 76 may be hidden behind an open able lid. The device 10 may be connected to a computer by wireless technology such as Bluetooth, any other radio technology or any other suitable wireless technology.

The various pieces of the device 10 may be adhered together so that screws are not necessary. The device 10 may be designed so that the connecting unit 18 is made adjustable to adjust the gap between the units 14, 16 to accommodate the device 10 to different hand sizes. If desired, the device 10 may be attached directly to a PDA.

Figure 5:
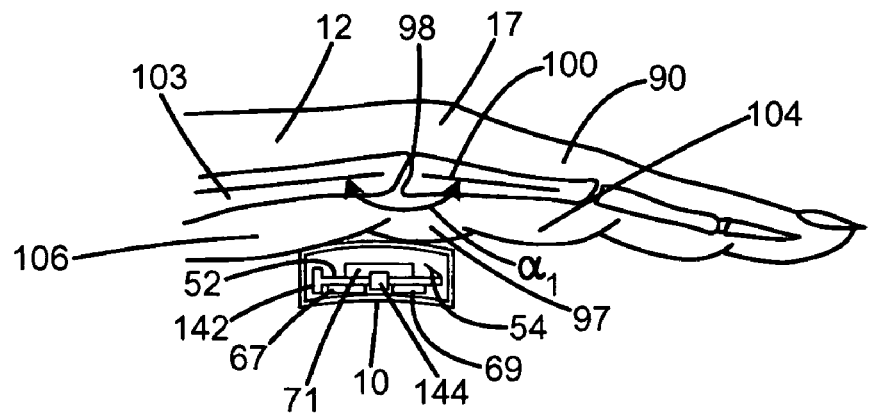
FIG. 5 is a cross-sectional view of the handheld device with a finger resting on the device.
Figure 6A:
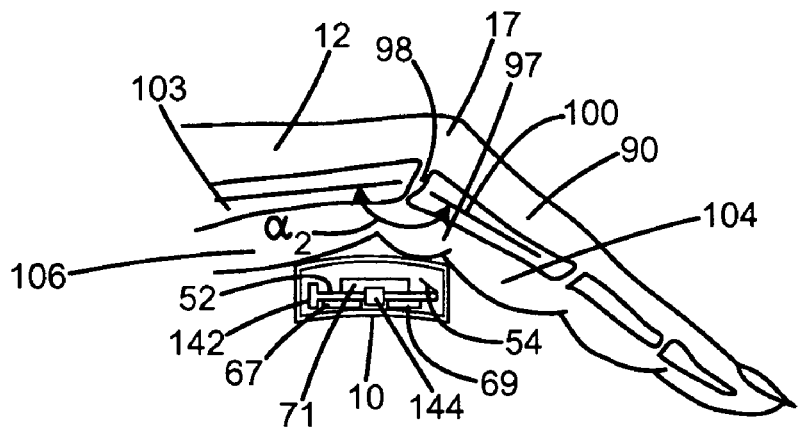
FIG. 6a is a cross-sectional view of the handheld device with a finger activating the device.

FIGS. 5-6 show a hand and a finger, such as a distal portion 97 of the palm 106 bearing against the device 10. More particularly, the device 10 is placed below a metacarpophalangeal (MCP) joint 98 so that the device 10 may register movements of the finger portion 100 relative to the meta carpal bone 103 of the hand 12. Preferably, the portion 23 should be positioned beyond or behind the joint 98 so that the portion 23 is positioned behind the proximal phalanx 100 of the finger. When the portion 100 is moved downwardly relative to the bone 103 to reduce an angle alpha1, as best shown in FIG. 5, to an angle alpha2, as best shown in FIG. 6a the output, related to the actual finger to which portion 100 belongs, is from the individual sensors, 54a . . . 54x, transformed through the linear combination to a value that is changed proportionally to the metacarpophalangeal joint angle. It should be noted that the lower unit 14 may be made of a stiff material and that the activating finger does not deform the lower unit 14. The sensors 54a . . . 54x may be used to measure changes in a capacitance of the sensors close to the moving finger.

Figure 6B:
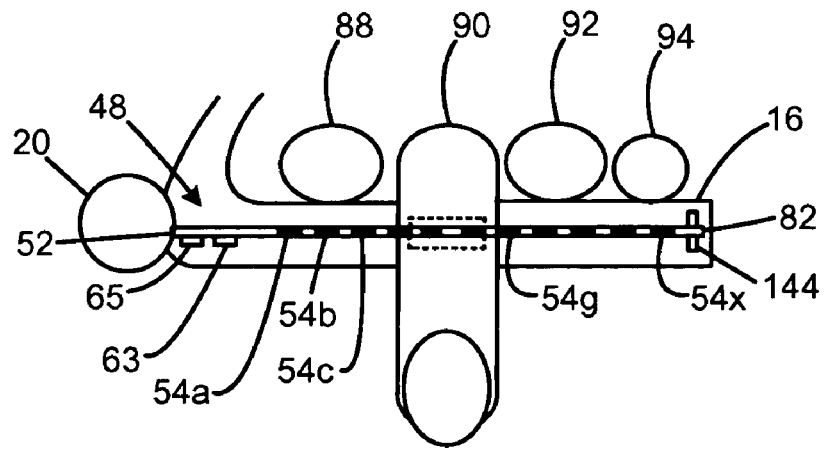
FIG. 6b is a cross-sectional front view of the handheld device with a finger activating the device.

More particularly, movements in the metacarpophalangeal joint 98, disposed between the proximal phalanx 100 and the meta carpal bone 103 of the hand 12, is measured. As shown in FIG. 6b, when the middle finger 90 moves downwardly by a movement in the metacarpophalangeal joint 98, the sensors 54d, 54e and 54f change their values more than the sensors 54a to 54c and 54g to 54x. The changes of the values of 54d to 54f are by the linear combinations of all sensors resulting in a change in the output for the middle finger, whereas the other linear combinations for other finger movements are changed less.

The linear combination for the middle finger changes in size of the metacarpophalangeal joint angle so that the sensor 54 can continuously register the different positions. The angle alpha1 may be close to 180° or slightly less. The bending of the finger 90 is registered by the individual sensors 54d to 54f. It is to be understood that the finger 90 is used as an example and the same principle applies to all the fingers.

The device 10 may also have a first function button 63 on the portion 70 engaged by pressing the unit 30 downwards with the thumb and a second function button 65 engaged by pressing the unit 30 upwards or inwards with the thumb. The function 63 may be used for but not limited to an on/off function. It may also be possible to deactivate the device 10 by a certain finger movement or by not using the device for a certain time.

As mentioned above, when the device 10 of the present invention is used as a text input device, it is not necessary that the user is actually using a conventional keyboard. It is sufficient to move the fingers as if the user is typing such as by pressing the fingers against a table surface or thigh to move the proximal phalanx of a finger and thereby changing the angle of the metacarpophalangeal joints of the hands. Because the sensors are continuously sending signals and these signals are continuously measured, it is possible to pre-set a signaling level that will trigger an event that a finger impact has occurred. It is important to note that it is not necessary for the user or operator to hit a specific spot on the table or whatever surface the fingers are hitting. It is enough to make a sufficient movement in the metacarpophalangeal joints to transmit a signal regardless where on the table surface the fingertips hit. It is also important to note that the fingers do not necessarily have to be in active contact with the front portion 22 to activate the sensors.

It may also be possible to adjust the device 10 so that the sensors are placed on top of each finger to measure the movements of the joints and fingers. One advantage of having the device 10 on the back of the hand is that it frees up the inside of the hand for other tasks. In this way, all the measurements of the finger movements are performed on the back of the hand and the fingers. For certain sensor techniques, another advantage of placing the sensors on top of the fingers may be that it could be easier to register changes in the angle of the metacarpophalangeal joints of the hands.

Figure 7:
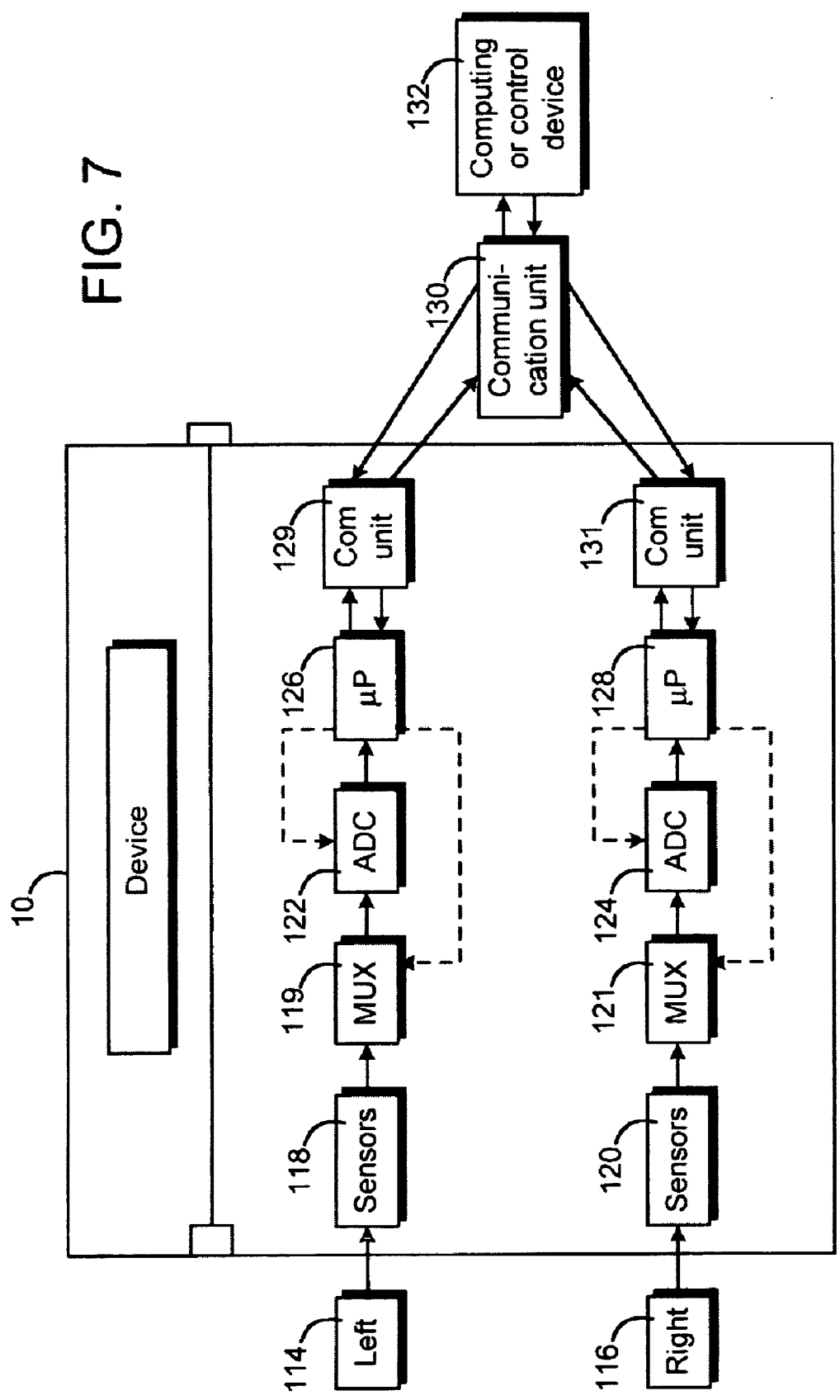
FIG. 7 is a schematic flow diagram of the information flow of the present invention.

FIG. 7 is a schematic diagram showing the information flow within the present invention. The device 10 is connected to a left side portion 114, corresponding to the fingers of a left hand of a user, and a right side portion 116, corresponding to the fingers of a right hand of the user. The portions 114, 116 are in operative engagement with sensors 118, 120, respectively, to activate the sensors so that the sensors 118, 120 may continuously send signals, as a result of registered movements by the portions 114, 116. The sensors 118, 120 continuously send signals to multi-plexer units 119, 121, respectively. The units 119, 121 are hardware devices that enables two or more signals to be transmitted over the same circuit at the same time by temporarily combining them into a single signal.

On the receiving end, the signals are divided again by a demulti-plexer that may be part of the microprocessors 126, 128. The processors may guide and distribute the tasks as is symbolized with dashed lines in FIG. 7. Values are continuously being sent from the sensors to the multi-plexer units that in turn send instructions to both the sensors and the multi-plexer units. The analog digital converters 122, 124, respectively, convert the analog signals from the sensors to digital signals before the signals are forwarded to the microprocessors 126, 128.

The microprocessors 126, 128 process the signals in mathematical operations, such as an artificial learning system or pattern recognizer, before the signals are sent via a communication unit 130 to a computing device 132 such as a computer, robotics, PDA, telephone or any other control device. The computing device 132 may also be a part of the device 10. Communication units 129, 131 are connected to the microprocessors 126, 128, respectively. The units 129 and 131 are connected to each other, the unit 131 is then connected to the communication unit 130. The unit 130 may be connected to the receiver via any suitable communication technology such as radio-transmission, infrared, sound, or cable. The computing device 132 may then display the text if the device 10 is used as a typing device.

The switch units 133, 137 are connected to the microprocessor unit 126 and 128 respectively and may be used for control functions such as on/off. The microprocessor units 126, 128 are connected to the display units 135 and 139 respectively. The units 135, 139 may indicate different functions, such as, but not limited to on/off, battery status and Bluetooth. The units 135, 139 may also show the keyboard layout and may indicate the virtual character or function the activated finger is hovering above giving the user improved feedback. If used in a text input application the units 135, 139 may also show the latest typed character.

In a preferred embodiment, at least three double axis accelerometers may be adhered to the sensors 118, 120. With the accelerometers placed in a certain distance from each other, all rotations around all three axis as well as all translations along all three directions (3-D) can be obtained. It may also be possible to adhere two or more one-axis accelerometers or two or more three-axis accelerometers. The software in 126 and 128 keeps track of the acceleration and angular momentums, calculated by the use of a transformation matrix that is non-singular. It should be noted that the microprocessor could also be hardware and firmware and the invention is not limited to software. The actual placement of the accelerometers is critical for obtaining a non-singular transformation matrix. From the accelerations and angular momenta the speed and positions as well as rotation speed and angle in all directions and all orientations can be calculated in 126 and 128.

The output from the sensor 54 can be used to select which finger is being used in a text-input application. If the information from sensor 54 is combined with the information from the accelerometers, the actual position of the hand and the finger performing the actual keystroke can be deduced and hence imitate a full sized QWERTY keyboard or any other keyboard layout. More specifically, the point in time when the keystroke is being performed can be deduced from the z-movement that is calculated from the accelerometers. With the information from the point in time of the keystroke combined with what finger is doing the keystroke combined with its relative position on a surface constituting a virtual keyboard, the uniqueness of the key of the actual keystroke can be obtained.

The calculations of the linear combinations can preferably be performed by the use of an artificial learning system that adapts to the users finger locations in the array of sensors in 54 (54a . . . 54x).

The artificial learning system may remove certain letter possibilities as very unlikely and a language processor may carry on the analysis to finally determine which letter and words are intended by the user. The artificial learning system is particularly useful in determining which letter is intended by reviewing columns of letters. The module determining sideways movement such as the difference between the letter "f" and the letter "g" on a conventional keyboard because the letters are beside one another and the letter "f", for example, is further away from the thumb compared to the letter "g". The module may also learn how most people type "f" compared to "g" by letting a large number of people use the system and record how most people use all the fingers when certain letters are intended to be typed.

The language processor may also have an artificial learning system module. This module analyzes the movement of not only the finger that is activated but also the other fingers when determining which letter or command the user intended. The module analyzes a pattern of signals from all the fingers and may filter away unlikely letters. The module may also store unusual finger movement patterns that are used for certain letters. The module may also learn from the user's corrections once the user sees what is being displayed. In this way, the module may be trained to recognize which letter is intended by the user by analyzing the movements of all the fingers in relation to one another. The module may be set so that only certain values are treated as acceptable letters and signs. In this way, the number of possible letters is drastically reduced before the language processor starts the analysis.

By using the artificial learning system, it may be possible to determine which letter is intended by the user without using a language processor. Since the dominant thumb is most often used for the space bar, the less dominant thumb may be used to activate a back space command.

The user may also set the input speed and whether the user is using the fingers to create a hard or relatively soft impact on a surface because the movement pattern may change depending upon how fast the user is typing and how hard the fingers are hit against a surface. It may also be possible to keep separate networks for letters and numbers. Predefined finger movements may be used to replace the function of a computer mouse.

The accelerometers may also be used for a mouse function. The resulting orientation and position in using all six degrees of freedom, three axis of rotation and three dimensions of translation, can be used fully or partially to obtain a mouse function. In the case of using only two dimensions of the position, a standard mouse is obtained.

The use of a three dimensional position and all rotations has possible usage in gaming applications. Additional degrees of freedom can be added by also using information from sensor 54 for the position of the individual fingers. With a combination of two units (one per hand) and a total of eleven degrees of freedom per hand the result in a system of twenty-two degrees of freedom can be obtained. This outperforms music input systems that today have realized twelve degrees of freedom.

The computing device 132 may include a language processor that may elaborate input streams into words. The language processor may also be used to compose words into sentences and to display the most likely sentences. The language processor may propose possible corrections required if the sentence has ambiguities. When using a conventional keyboard, each finger may be used for several characters including punctuation marks and other signs.

Each finger stroke may be analyzed both on a lexical level and on a syntactic level. The language processor may also analyze the frequency ranking level. The lexical analysis may include pre-matching any three letters into a tri-gram dictionary. In other words, the language processor defines a tri-gram of three letter sequences that exist in at least one word in the English dictionary. One goal of the tri-gram matching is to minimize the number of searches in a dictionary of English words and to speed up the processing time because the three letter combinations that do not exist in the English language are eliminated. Words that are shorter than three letters may be directly matched without using the tri-gram analysis.

When the words have more than three letters, it is necessary to merge through sliding tri-grams. For every sequence of three letters, the process may establish all the possible tri-grams that can be found in a dictionary database. Any previous tri-grams may be matched with the current tri-grams and the results are stored. These steps are repeated until a space is encountered. When the trigram analysis is completed, the language processor conducts a dictionary match that results in a set of possible words. Every word in the set is then mapped into possible phrases. The resulting phrases may then be matched against possible known sentence structures.

As soon as a space is encountered, the language processor knows the length of the word. The language processor may also know which finger was used for the first letter. Groups of words that match these criteria may be ordered according to the letter configuration of a conventional keyboard i.e.— q,w,e,r,t,y,u,i,o,p,a,s,d,f,g,h,j,k,l,z,x,c,v,b,n,m.

The language processor may also analyze the typed words depending upon whether the word is a noun, verb, auxiliary, preposition etc. Some words may belong to several syntactic groups. For example, the word "can" is both a noun and an auxiliary. The language processor may determine which syntactic group should be used based on where in the sentence the word is used. When the language processor cannot determine which syntactic rule applies, the language processor may have a default setting to display the most frequently used type of words. In most cases, a sequence of finger strokes does not produce one word only but a set of words. The intended word type may be selected according to the phrase structure grammar and the word frequency.

The phrase structure grammar may employ phrases to describe the syntactic structure of a sentence by describing the sentence as a phrase structure. The phrase structures are combinations of words, such as determiner-nouns and auxiliary-verbs. The structures describe the word types that make up a particular phrase. It considers the syntactic context of words by matching the adjacent word types against the phrase structures. The syntactic processor may use a simple grammar of phrase structures, which could be included in a database. It parses through the input sentence to match each sentence word against the phrase structure, which results in a description of phrases and word types in the sentence. After the input sentence is parsed, some sentence words could remain unmatched when, for example, the word is misspelled or the words are not represented in a phrase structure. This means that there is no phrase structure that matches the input sequence of word types. In this case, the outcome for every word in the sentence will be the most frequent word for each word set. The language processor may also simply bypass the word.

When a sentence is matched, there could still be more than one possible sentence. The frequency of every word, among the ones matching at least one sentence structure, may be used to determine which words should be displayed. The sentences may therefore be ranked based on the frequency of occurrence of each word. The sentences that have the words with the highest total score may be selected and displayed. When the language processor encounters a punctuation, it may be programmed to consider the sentence as being finished and starts to perform the syntactical analysis and the highest ranked sentence may be displayed. The language processor may also conduct a semantic analysis of the sentence so that the meaning of the words is considered.

In an alternative embodiment, a remote sensor may recognize and register the sound created by the fingers hitting a surface. The sensor may distinguish between the different fingers because the fingers have, for example, different lengths and thickness that create different sound vibrations when the fingers hit a surface.

Regarding the electric field sensing, a signal with a constant frequency (I) is generated and fed into an electrode 55. The current from the electrode 55 is led into the various sensors 54a . . . 54x over a capacitance. A multi-plexer is used to select one of the sensors 54a . . . 54x at a time. The output from the multi-plexer is converted to a DC signal by a phase detector using a phase shifted signal of the generated frequency (I). The DC signal is measured by an analog-to-digital converter and used in the processing unit. The processing unit selects which of the sensors 54a. . . 54x are to be fed into the analog-to-digital converter. The sensors 54a . . . 54x are placed in a row across and at the base of the fingers. If not any of the fingers are close to the sensors 54a . . . 54x the current from the electrode 55 will only flow into the sensors 54a . . . 54x but as soon as any of the fingers or several are moved closer to the sensors 54a . . . 54x current will start to also flow from the electrode 55 into the fingers that are close to the sensors 54a . . . 54x. The closer an individual finger is to those of the sensors 54a . . . 54x that correspond to that finger the more current will flow to that finger instead of flowing into the respective sensor 54a . . . 54x. A lowering of the current into one or several of the sensors 54a . . . 54x will result in a lower DC signal for the respective finger.

Compared to other applications of electric field sensing, the device of the present invention measures the relative distances of individual body parts, such as the fingers relative to one single part, such as the palm of the hand.

While the present invention has been described in accordance with preferred compositions and embodiments, it is to be understood that certain substitutions and alterations may be made thereto without departing from the spirit and scope of the following claims.

The invention claimed is:

1. A method of entering data into a computer device, comprising:

providing a wearable device and attaching the wearable device to a first body part, the wearable device having a lower unit and an upper unit connected to the lower unit, the wearable device having sensors in operative engagement therewith for registering movements, the wearable device having a first accelerometer and a second accelerometer;

moving a segment of a second body part relative to the wearable device;

the movement of the segment of a second body part activating the sensors;

the sensors registering the movement of the segment of the second body part relative to the wearable device; and the sensors sending signals to a microprocessor unit;

the first accelerometer sensing at least an acceleration movement in a first direction;

the second accelerometer sensing at least an acceleration movement in a second direction;

the first and second accelerometers sending acceleration movement signals to a microprocessor unit;

the microprocessor unit storing acceleration movement signals from the accelerometers and signals from the sensors to learn movements of the body parts;

attaching the first accelerometer on a board disposed in the upper unit of the wearable device; and placing the second and a third accelerometers on a board disposed in the lower unit of the wearable device so that the second and third accelerometers are remote from the first accelerometer.

2. The method according to claim 1 wherein the method further comprises activating the sensors without having any physical contact with the sensors.

3. The method according to claim 1 wherein the method further comprises making the lower unit of a non-deformable material.

4. The method according to claim 2 wherein the method further comprises measuring a distance between the sensors and a finger of a hand.

5. The method according to claim 2 wherein the method further comprises calculating a capacitance value.

6. The method according to claim 1 wherein a finger is not in physical contact with the sensors during activation of the sensors.

7. The method according to claim 1 wherein the sensors are activated by a loss of current flowing from an electrode to the sensors as a result of a proximity of a finger to the sensors.

8. The method according to claim 1 wherein the method further comprises registering movements in the metacarpophalangeal joint.

9. The method according to claim 1 wherein the method further comprises providing a third accelerometer, the first accelerometer measuring acceleration movements in a y-direction and a z-direction, the second accelerometer measuring acceleration movements in a x-direction and in a z-direction, the third accelerometer measuring acceleration movements in a x-direction and a y-direction.

* * * * *